Figure 1:
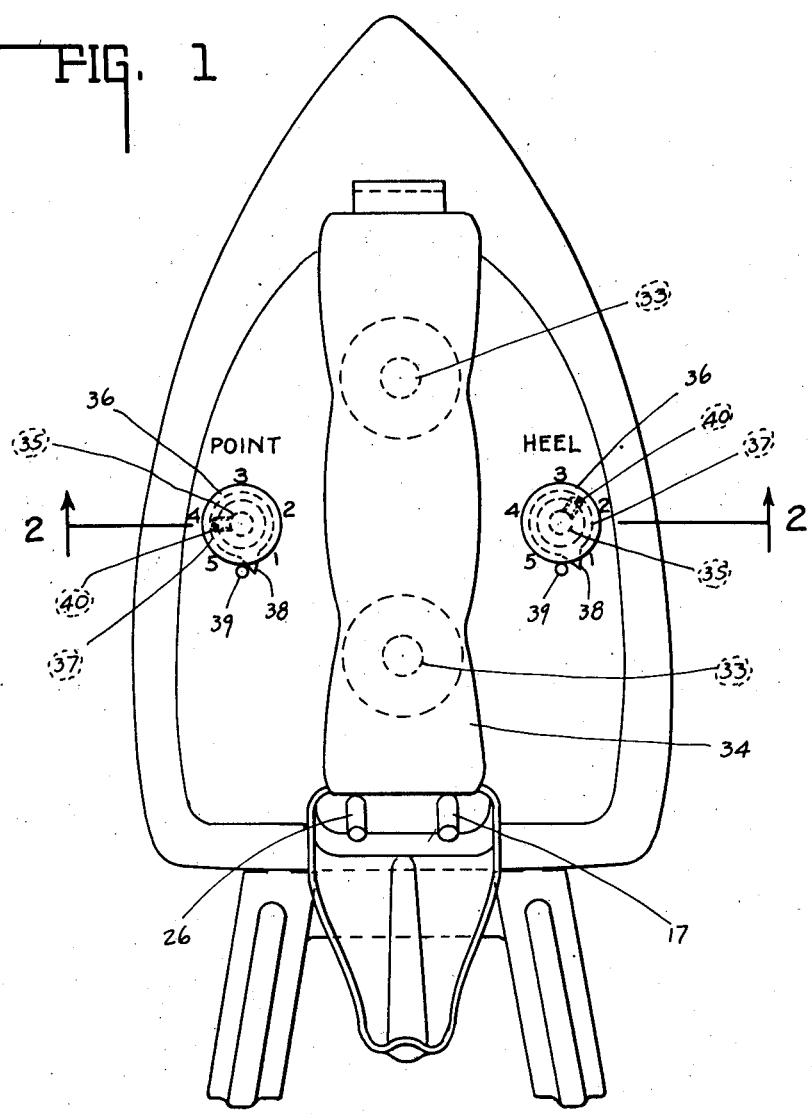

Jan. 12, 1932.   G. A. BELL   1,840,652
ELECTRIC SADIRON
Filed Nov. 29, 1929   2 Sheets-Sheet 1

INVENTOR.
GEORGE A. BELL.
BY
Lockwood Lockwood Goldsmith & Ball
ATTORNEYS.

Jan. 12, 1932.   G. A. BELL   1,840,652
ELECTRIC SADIRON
Filed Nov. 29, 1929   2 Sheets-Sheet 2
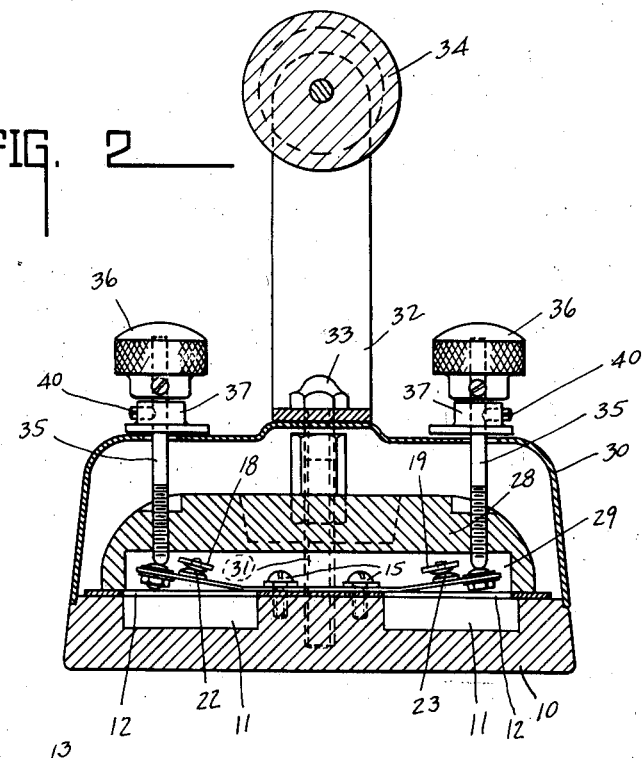
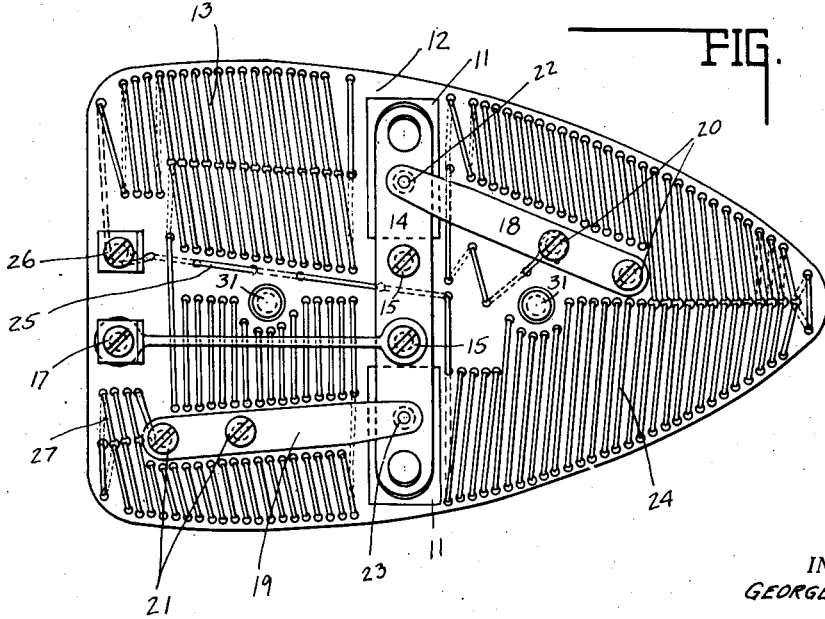
INVENTOR.
GEORGE A. BELL.
BY
Lockwood Lockwood Goldsmith & Galt.
ATTORNEYS.

Patented Jan. 12, 1932

1,840,652

UNITED STATES PATENT OFFICE

GEORGE A. BELL, OF MARION, INDIANA, ASSIGNOR TO RUTENBER ELECTRIC COMPANY, OF MARION, INDIANA, A CORPORATION

ELECTRIC SADIRON

Application filed November 29, 1929. Serial No. 410,291.

This invention relates to an automatic electric sad iron.

The principal object of the invention is to provide an iron which may be automatically maintained at a predetermined temperature and in which the said temperature may be conveniently and easily varied to suit the conditions of use.

One feature of the invention resides in the provision of a thermostatic switch for controlling the current provided for the heating elements of the iron together with an externally operable adjusting means for said thermostatic switch. The adjusting means carries an index for indicating the degree of temperature over a certain limited range. The index itself is adjustable so that the range of temperatures controlled by the adjusting means may also be varied at will.

Another feature of the invention resides in the provision of separate heating elements for the toe and heel of the iron with separate thermostatic switches for each heating element. By this means either the heel or the toe may be made hotter as desired. In the use of the iron for certain purposes, such as the ironing of ruffles, it is very desirable to have the toe hotter than the heel since the heel constantly traverses the same portion of the ironing board and is not used in the actual ironing operation.

Another advantage derived from the use of the two heating elements is the fact that the power supplied is divided into two currents. Thus each of the thermostatic switches handles only half the current necessary for the heating of the iron. Arcing at the contact points and consequent burning thereof is thereby greatly reduced.

Other objects and features of the invention will be understood from the accompanying drawings and the following description and claims:

Fig. 1 is a plan view of an iron showing the position of the adjusting control and the index therefor for the toe and heel of the iron. Fig. 2 is a sectional view in elevation taken on the line 2—2 of Fig. 1. Fig. 3 is a plan view of the iron with parts removed to show the thermostatic switches and heating elements in detail.

The iron includes the usual lower body portion 10. The said portion is herein provided with a pair of recesses 11. A heating element 12, formed in the usual manner of mica sheets enclosing resistance elements 13, is positioned upon the base member 10 and is provided with openings corresponding in position to the recesses 11. An electrical contact member 14 is fastened by means of screws 15 to the body member 10. The contact member 14 is insulated from the body member 10 by the mica of the heating unit 12 and the screws 15 are insulated therefrom by other suitable means. The member 14 is non-thermostatic in character and will not, therefore, be caused to deflect by changes in temperature. The member 14, however, is flexible and may be deflected by mechanical pressure at either end. An electrical conductor 16 connects the contact member 14 with a terminal 17 to which may be connected one of the electric supply lines for the iron.

A pair of thermostatic contact members 18 and 19 are provided fastened to the body member 10 by means of screws 20 and 21. The members 18 and 19 are insulated from the base member and the screws 20 and 21 in the same manner as the contact member 14. One end of the member 18 carries a contact point 22 adapted to contact with a similar point carried by the member 14 adjacent one of its ends. The contact member 19 carries a similar contact point 23 adapted to contact with a similar point adjacent the opposite end of the contact member 14. Because of the thermostatic character of the material of which the contact members 18 and 19 are formed, each of them will be upwardly deflected as the temperature increases. The form of these members is such that, when cold, each exerts a pressure upon the member 14. As the temperature increases, the said pressure decreases until a predetermined temperature is reached at which the contact between points 22 or 23 is broken. The exertion of mechanical pressure upon the outer ends of the member 14 causes the flexure of the said member and thereby decreases the initial pressure exerted upon the said member by members 18 and 19 and accordingly decreases the predetermined temperature at which the contact is broken.

As illustrated in Fig. 3, the contact member 18 extends into the toe portion of the iron and the contact member 19 extends into the heel portion. The first of said members, therefore, reacts responsive to the temperature of the toe while the second reacts responsive to the temperature of the heel. The contact member 18 is connected to one end of a resistance element 24 which is arranged in the toe of the iron. The other end of the said resistance element is connected by a conductor 25 to a terminal 26 to which may be connected the opposite power supply line for the iron. The resistance element 24 supplies the heat for the toe of the iron and the said heat is, therefore, controlled by the contact at the points 22. A contact member 19 is similarly connected to a resistance element 27, the opposite end of which is also connected to the terminal 26. The resistance element 27 is arranged in the heel of the iron and is controlled by the contact points 23.

The iron is also fitted with an upper body portion 28 having a recess 29 for the reception of the contact members 14, 18 and 19. The upper body portion 28 is covered by a common form of pressed sheet metal cover 30. A pair of studs 31 are fixed in the lower body portion 10 and extend through the heating element 12, body portion 28, cover 30 and through a handle support 32. A nut 33 is secured to the upper end of each of the studs 31 and serves to hold the iron in assembled relation. The usual form of handle 34 is carried by the handle support 32.

A pair of pins 35 extend through openings in the cover 30 and threadedly engage the upper body member 28. The pins 35 are positioned above the ends of the flexible contact member 14 and carry at their upper ends thumb nuts 36. The rotation of the pins 35, by means of the thumb nuts 36, in one direction forces the said pins into contact with the outer ends of the flexible member 14 and thereby exerts the necessary mechanical pressure thereon to vary the temperature at which the contacts 22 and 23 are broken. By the proper positioning of the pin 35, this temperature may be varied as desired. An index member is carried on each of the pins 35 and carries a point 38 adapted to engage a stop pin 39. A plurality of numerals illustrated in Fig. 1 by the numerals 1 to 5 inclusive are stamped on the cover 30 in the path of travel of the point 38 to indicate the position of the pins 35 for several desired temperatures. The movement of the pin 35 to move the index point 38 from the stop pin 39 around until it again contacts with the stop pin will, therefore, control the temperature of the toe or the heel of the iron through a limited range. For varying the range of control, the index member 37 may be repositioned upon the pin 35 by means of a set screw 40. The latter feature is important in allowing a dealer or salesman to adjust the iron for any range of temperature desired by the user thereof without dismantling the iron. The temperature may thereafter be controlled within the desired range by an operator having little or no experience or knowledge of electrical apparatus.

The invention claimed is:

1. In an electric sadiron, the combination of a body member, a flexible electrical conductor having its center fastened to said body member but insulated therefrom, said conductor extending transversely of said iron approximately half way between the toe and heel thereof, and the ends of said conductor being freely movable, a thermostatic strip having a free end normally pressing upon said conductor adjacent one of the free ends thereof, said strip extending toward the toe of said iron and having its opposite end fastened to said body member but insulated therefrom, a second thermostatic strip similarly engaging said conductor adjacent the opposite end thereof, extending toward the heel of said iron and similarly fastened to said body member, an electrical heating element in the toe of said iron electrically connected to the first of said thermostatic strips, an electrical heating element in the heel of said iron electrically connected to the other of said strips, a pair of terminals, and electrical connections between one of said terminals and both of said heating elements and between the other of said terminals and said flexible conductor.

2. The combinaiton as set forth in claim 1 characterized by the addition of a pair of vertical pins threadedly engaging said body and each having its lower end engaging one of the free ends of said flexible conductor, and a knob carried by each of said pins for rotating the same to vary the pressure between said conductor and the corresponding thermostatic strip.

In witness whereof, I have hereunto affixed my signature.

GEORGE A. BELL.